United States Patent
Kim

(10) Patent No.: US 7,852,506 B2
(45) Date of Patent: Dec. 14, 2010

(54) METHOD AND APPARATUS TO MANAGE PRINT JOBS USING LABELING

(75) Inventor: Myoung-sim Kim, Daegu Metropolitan (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 1177 days.

(21) Appl. No.: 11/244,073

(22) Filed: Oct. 6, 2005

(65) Prior Publication Data

US 2006/0126109 A1 Jun. 15, 2006

(30) Foreign Application Priority Data

Dec. 13, 2004 (KR) .................... 10-2004-0104820

(51) Int. Cl.
*G06F 3/12* (2006.01)
*G06K 15/00* (2006.01)

(52) U.S. Cl. .................... 358/1.15; 358/1.18; 358/1.16

(58) Field of Classification Search .............. 358/1.15, 358/1.18, 1.1, 1.2, 1.6, 1.9, 1.11, 1.13, 1.14, 358/1.16, 1.17, 400, 401, 403, 404, 407, 358/444, 468; 347/2, 3, 5, 14, 23; 345/156; 399/1, 8; 715/274, 273, 700
See application file for complete search history.

(56) References Cited

U.S. PATENT DOCUMENTS 6,166,826 A * 12/2000 Yokoyama ................. 358/1.16
6,384,923 B1 * 5/2002 Lahey ....................... 358/1.13
2002/0140974 A1 * 10/2002 Imaizumi et al. ........... 358/1.15
2002/0196460 A1 * 12/2002 Parry ........................ 358/1.15

FOREIGN PATENT DOCUMENTS

| JP | 7-1772 | | 1/1995 |
| JP | 2001-105689 | * | 4/2001 |
| JP | 2003-19831 | | 1/2003 |
| JP | 2003-114781 | | 4/2003 |
| KR | 2000-66827 | | 11/2000 |
| KR | 2003-59693 | | 7/2003 |
| KR | 2004-65930 | | 7/2004 |

* cited by examiner

*Primary Examiner*—Dov Popovici
(74) *Attorney, Agent, or Firm*—Stanzione & Kim LLP

(57) ABSTRACT

A method and apparatus to manage print jobs using labeling. The apparatus includes a user interface, a data storage unit to store the print jobs, and a controller to display predetermined types of job labels via a display device, to generate a job management table by relating at least one job label selected through the user interface with identification information of a corresponding print job, and to store the job management table in the data storage unit. The user can classify the print jobs as the user desires, and a print job desired by the user can be easily and quickly searched regardless of where the print job is stored in a network.

14 Claims, 4 Drawing Sheets

| FILE NAME | LABEL | STORAGE LOCATION |
|---|---|---|
| FILE #0 | PROJECT # 0, THEME # 0, WRITER # 0 | HOST # 0 |
| FILE #1 | PROJECT # 1, WRITER # 1 | PRINTER #0 |
| ⋮ | ⋮ | ⋮ |

# METHOD AND APPARATUS TO MANAGE PRINT JOBS USING LABELING

CROSS-REFERENCE TO RELATED APPLICATIONS

This application claims the priority under 35 U.S.C. §119 of Korean Patent Application No. 2004-104820, filed on Dec. 13, 2004, in the Korean Intellectual Property Office, the disclosure of which is incorporated herein in its entirety by reference.

BACKGROUND OF THE INVENTION

1. Field of the Invention

The present general inventive concept relates to a method and apparatus to mage print jobs, and more particularly, to a method and apparatus to manage jobs using labeling.

2. Description of the Related Art

A job is data that is converted into a printable format by a printing device, or original data before it is converted into the printable format. Since printing devices, such as printers, have data storage media, like hard disks, jobs can be stored not only in a host that is connected to a printer but also in the printer. Particularly, in a system where a plurality of hosts and a plurality of printing devices are connected via a network, a job can be stored in both the plurality of hosts and the plurality of printing devices. Therefore, a method of managing jobs that allows a user to easily search the jobs is required. Furthermore, a method of managing jobs in which a job desired by a user can be searched even if basic information, such as a file name, of the desired job is unknown is required.

SUMMARY OF THE INVENTION

The present general inventive concept provides an apparatus that can easily manage jobs using labeling.

The present general inventive concept also provides a method of easily managing jobs using labeling.

Additional aspects of the present general inventive concept will be set forth in part in the description which follows and, in part, will be obvious from the description, or may be learned by practice of the general inventive concept.

The foregoing and/or other aspects of the present general inventive concept may be achieved by providing an apparatus to manage jobs using labeling. The apparatus includes a user interface, a data storage unit to store the jobs, the jobs being original data converted into a printable format or the original data before it is converted into the printable format and a controller to display predetermined types of job labels via a display device, to generate a job management table by relating at least one job label selected through the user interface with identification information of a corresponding job, and to store the job management table in the data storage unit.

The foregoing and/or other aspects of the present general inventive concept may also be achieved by providing an apparatus to manage jobs using labeling. The apparatus includes a user interface, a data storage unit to store the jobs, the jobs being original data converted into a printable format or the original data before it is converted into the printable format, and a controller to display predetermined types of job labels on a display device according to a command input via the user interface, and to search a job management table to select a job related to at least one job label selected through the user interface after receiving the selected at least one job label.

The foregoing and/or other aspects of the present general inventive concept may also be achieved by providing a method of managing jobs using labeling. The method includes displaying predetermined types of job labels on a display device to select one of the displayed job labels corresponding to jobs, generating a job management table by relating the selected job label with identification information of the corresponding job; and storing the job management table in a data storage unit.

The foregoing and/or other aspects of the present general inventive concept may also be achieved by providing a method of managing jobs using labeling. The method includes displaying predetermined types of job labels on a display device, receiving at least one input job label, and searching a job management table in which identification information of jobs are stored in relation to the received at least one input job label, and selecting the identification information of a job related to the received at least one input job label, wherein the jobs include one of original data converted into a printable format by a printing device and the original data before it is converted into the printable format.

BRIEF DESCRIPTION OF THE DRAWINGS

These and/or other aspects of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
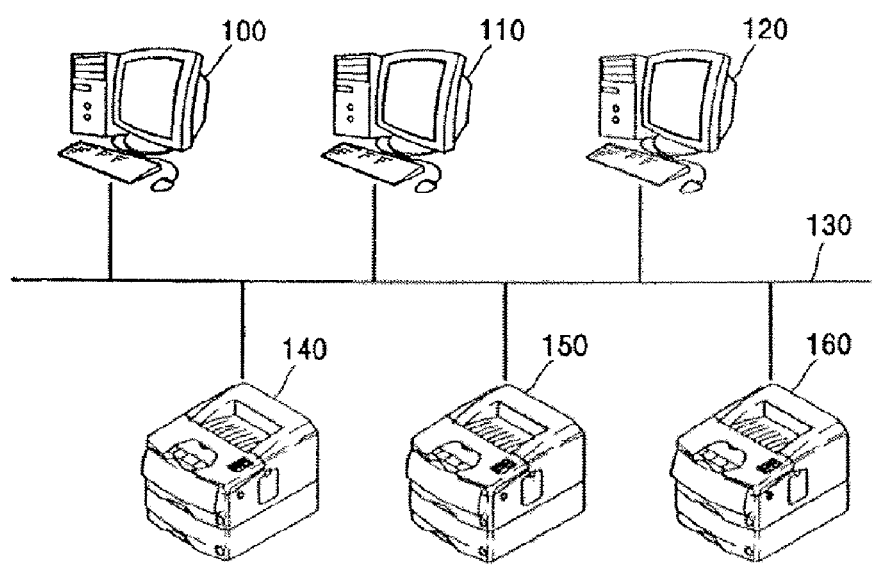
FIG. 1 is a schematic view illustrating a system according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

FIG. 1 is a schematic view illustrating a system according to an embodiment of the present general inventive concept. Referring to FIG. 1, a plurality of hosts 100, 110, and 120, and a plurality of printing devices 140, 150, and 160 are connected to a network 130. Each of the plurality of hosts 100, 110, and 120 can transmit a print command to any one of the plurality of printing devices 140, 150, and 160 and output a job. Furthermore, the job can be stored in at least one of the plurality of hosts 100, 110, and 120 and the plurality of printing devices 140, 150, and 160. Here, the job refers to data that is converted into a printable format by one of the printing devices 140, 150, and 160, or original data before it is converted into the printable format. In addition, the printing devices 140, 150, and 160 refer to devices that can output the job, for example, various types of printers and multi-functional peripheral devices having a printing function.

Figure 2:
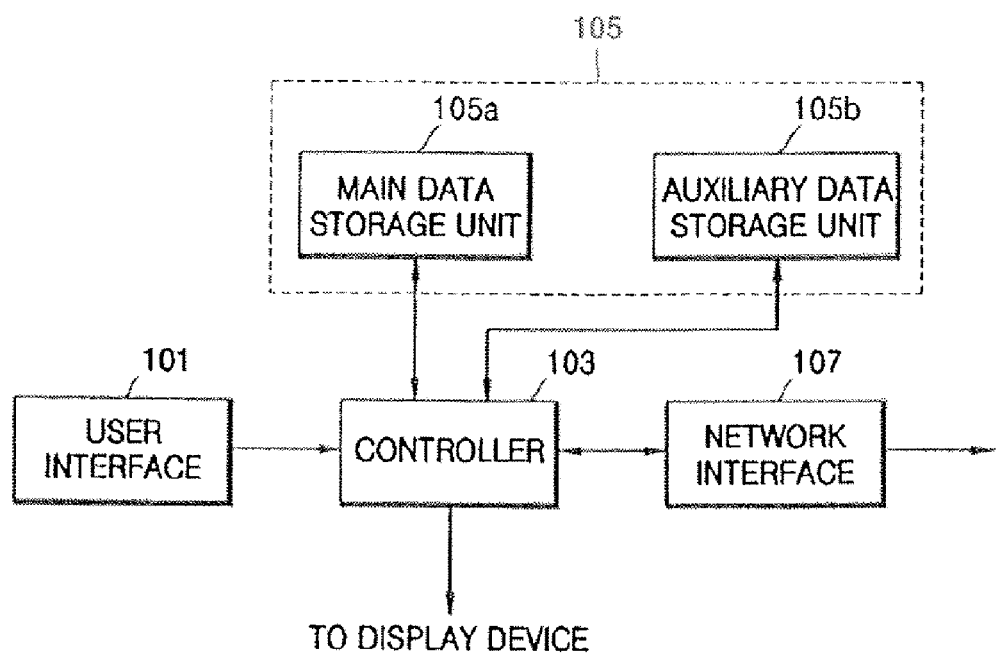
FIG. 2 is a block diagram illustrating an apparatus to manage jobs according to an embodiment of the present general inventive concept.

FIG. 2 is a block diagram illustrating an apparatus to manage jobs according to an embodiment of the preset general inventive concept. The apparatus to manage the jobs can be included in each of the plurality of hosts 100, 110, and 120 illustrated in FIG. 1. Referring to FIG. 2, the apparatus to manage the jobs includes a user interface 101, a controller 103, a data storage unit 105, and a network interface 107.

The user interface 101 interfaces with a user. That is, the user interface 101 receives a user command and transmits the user command to the controller 103. The user interface 101 can be a keyboard, a mouse, a touch screen, or the like.

The controller 103 processes the user command input via the user interface 101, and controls the data storage unit 105 and the network interface 107 to perform job management.

The data storage unit 105 can include a main data storage unit 105a and an auxiliary data storage unit 105b. The controller 103 loads various applications stored in the auxiliary data storage unit 105b to the main data storage unit 105a. The various applications loaded into the main data storage unit 105a begin operating when the user command is received. The network interface 107 interfaces with the network 130 (see FIG. 1) by the control of the controller 103 to communicate with the printing devices 140, 150, and 160 and other hosts.

Figure 3:
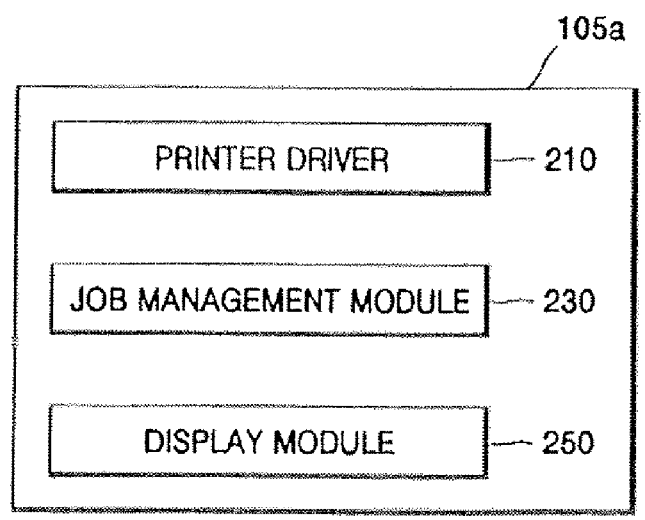
FIG. 3 is a view illustrating application loaded in a main data storage unit of the apparatus of FIG. 2 according to an embodiment of the present general inventive concept.

FIG. 3 is a view illustrating the main data storage unit 105a according to an embodiment of the present general inventive concept. Referring to FIG. 3, a printer driver 210, a job management module 230, and a display module 250 are loaded into the main data storage unit 105a from the auxiliary data storage unit 105b to perform the job management. The job management module 230 manages the jobs and labels of the jobs, and can be used by the user to search the jobs using the labels. Further, the user can correct a job management table as illustrated in FIG. 5, by operating the job management module 230.

The display module 250 displays screens used to manage the jobs via a display device (not shown). The user may search the jobs through the display module 250, or may check existing labels to label new jobs via the display device.

Methods of managing the jobs according to various embodiments of the present general inventive concept will be described based on the apparatus to manage the jobs illustrated in FIG. 2 with reference to FIGS. 4-6.

Figures 4, 5:
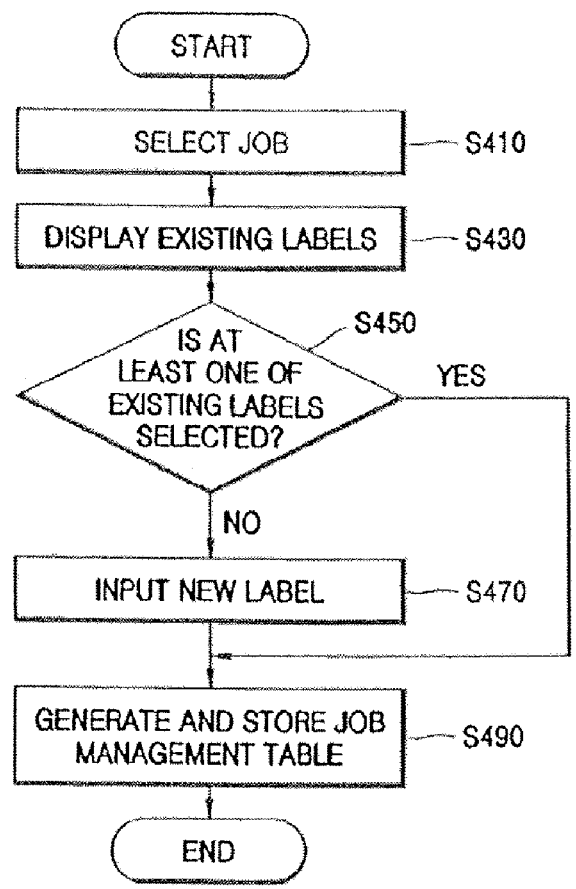
FIG. 4 is a flow chart illustrating a method of managing jobs according to an embodiment of the present general inventive concept.
FIG. 5 is a view illustrating a job management table according to an embodiment of the present general inventive concept.

FIG. 4 is a flow chart illustrating a method of managing jobs according to an embodiment of the present general inventive concept.

Referring to FIGS. 1-4, the controller 103 loads the job management module 230 and the display module 250 stored in the auxiliary storage unit 105b to the main data storage unit 105a in response to the user command, and operates the job management module 230 and the display module 250. The display module 250 displays a job management screen on the display device.

The user selects a job that is to be labeled using the user interface 101 (S410). Here, the selected job that is to be labeled can be stored in one of a host of the user, another host connected to the host of the user via the network 130, or one of the printing devices 140, 150, and 160.

The controller 103 displays existing labels on the display device so that user can see the existing labels (S430). Next it is determined whether the user selects one of the displayed existing labels (S450). When the user selects one of the displayed existing labels, a job management table in which the selected existing label and identification information of the job selected at operation S410 are interrelated is generated and stored in the data storage unit 105 (S490). However, when the user does not select one of the displayed existing labels, the user can input a new label (S470). Then, a job management table in which the input new label and the identification information of the job selected at operation S410 are interrelated is generated and stored in the data storage unit 105 (S490).

FIG. 5 is a view illustrating a job management table 500 according to an embodiment of the present general inventive concept. The job management table 500 can include fields to store a file name, a label, and a storage location corresponding to each job in the job management table. The file name is the identification information of the jobs, and the label is information selected or input by the user to classify and search the jobs. Referring to FIG. 5, a label of a file #0 is project #0, theme #0, and writer #0. That is, the label of the file #0 indicates that the file #0 is data related to the project #0 and theme #0, and is written by the writer #0. The user can easily search jobs since the jobs are effectively classified using labeling. The structure of the label can be decided by the user.

The field of the storage location of the job management table 500 indicates a location at which each of the jobs is stored. In the job management table 500 illustrated in FIG. 5, the file #0 is stored in a host #0, and a file #1 is stored in a printer #0.

Figure 6:
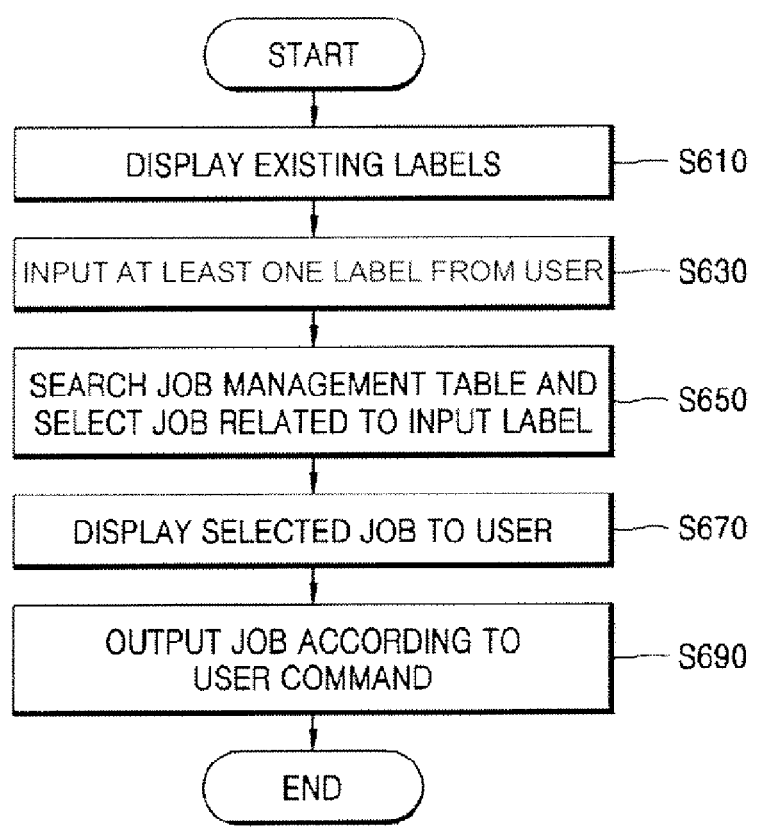
FIG. 6 is a flow chart illustrating a method of managing jobs according to another embodiment of the present general inventive concept.

FIG. 6 is a flow chart illustrating a method of managing jobs according to another embodiment of the present general inventive concept. The method illustrated in FIG. 6 is a method of searching for a job desired by the user using the job management table 500 as illustrated in FIG. 5.

While the job management module 230 and the display module 250 are operated by the controller 103, the controller 103 controls the display module 250 to display existing labels according to a user command so that the user can see the existing labels (S610). The user selects at least one label that coincides with characteristics of the desired job among the existing labels, and then inputs the selected label via the user interface 101 (S630).

The controller 103 searches the job management table 500 and selects the job corresponding to the label input by the user (S650). The controller 103 then extracts information regarding the selected job from the job management table 500, and displays the extracted information on the display device so that the user can see the extracted information (S670). After the user checks the displayed information regarding the selected job, the user can set printing options and input a print command. The controller 103, which receives the print command, checks where the selected job is stored by referring to the storage location field of the job management table 500, and then outputs the selected job (S690). That is, the controller 103 transmits the print command to a print device or another host when the selected job is stored in a printable format in the print device or the other host, respectively. However, when the selected job is stored in an original data type in the print device or the other host, the controller 103 retrieves the original data, converts the original data into data of the printable format, and then prints the searched job using one of the print devices.

According to the embodiments of the present general inventive concept as described above, jobs can be classified as a user desires by labeling the jobs, and a job desired by the user can be easily and quickly searched regardless of where the job is stored in a network. Furthermore, by appropriately labeling the jobs, the user may quickly search jobs the user desires and output the desired jobs.

The embodiments of the general inventive concept can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An apparatus connected to at least one host apparatus or at least one image forming apparatus to manage a print job using labeling in job classifications and/or job searches, the apparatus comprising:
    a user interface to receive a user command;
    a data storage unit to store the print job including original data or converted data in a printable format; and
    a controller to display selectable job labels to a user via a display device, to generate a job management table by relating at least one job label input by the user by being selected through the user interface and/or being newly input through the user interface with job identification information corresponding to a file name of the print job, and to store the job management table in the data storage unit.

2. The apparatus of claim 1, wherein the controller generates the job management table by relating the newly input job label with the job identification information of the print job in response to no selectable job labels being displayed.

3. The apparatus of claim 1, wherein the controller stores the print job in the data storage unit, the at least one host apparatus, or the at least one image forming apparatus.

4. The apparatus of claim 3, wherein the job management table comprises location information regarding the print job.

5. A method of managing an apparatus connected to at least one host apparatus or at least one image forming apparatus and managing a print job using labeling in job classifications and/or job searches, the method comprising:
    displaying selectable job labels on a display device to label a corresponding print job;
    generating a job management table by relating at least one job label input by a user by being selected through a user interface and/or being newly input through the user interface with job identification information corresponding to a file name of the print job; and
    storing the generated job management table in a data storage unit.

6. The method of claim 5, wherein the job management table is generated by relating the newly input job label with the job identification information of the print job in response to no selectable job labels being displayed.

7. The method of claim 5, wherein the job management table is stored in a data storage unit of the apparatus, the at least one host apparatus, or the at least one image forming apparatus.

8. The method of claim 5, wherein the job management table comprises storage location information of the print job.

9. An apparatus connected to at least one host apparatus or at least one image forming apparatus to manage a print job using labeling in job classifications and/or job searches, the apparatus comprising:
    a user interface to receive a user command;
    a data storage unit to store a job management table in which job identification information corresponding to a file name of the print job including original data or converted data in a printable format is stored by being related to at least one job label previously input by a user by selecting a selectable job label or being newly input through the user interface; and
    a controller to display the at least one previously input job label to the user via a display device according to the user command received through the user interface, and to select a print job related to a job label currently selected by the user through the user interface.

10. The apparatus of claim 9, wherein the print job is stored in any one of the data storage unit, the at least one host apparatus, or the at least one image forming apparatus; and
    the job management table comprises storage location information of the print lob related to the label.

11. The apparatus of claim 10, wherein, when an output command of the print job selected by the user is input, the controller obtains the storage location information of the selected print job from the job management table and controls the image forming apparatus to output the selected print job.

12. A method of managing an apparatus connected to at least one host apparatus or at least one image forming apparatus to manage a print job using labeling, the method comprising:
    displaying at least one label that is previously input through a display device;
    if the at least one label displayed through the display device is selected, extracting and displaying a print job related to the selected label by referring to a job management table including identification information and storage location information of at least one print job corresponding to the selected label; and
    searching a print option of the displayed print job and receiving a print command.

13. The method of claim 12, further comprising printing the print job according to the print option by using the storage location information of the print job.

14. The method of claim 13, wherein, when the print job is stored in a printable format in the at least one host apparatus or the at least one image forming apparatus, the print command is transferred to the at least one host apparatus or the at least one image forming apparatus and, when the print job is not in a printable format, the print job is requested from the at least one host apparatus or the at least one image forming apparatus.

* * * * *